US011236888B2

(12) United States Patent
Ansems et al.

(10) Patent No.: US 11,236,888 B2
(45) Date of Patent: Feb. 1, 2022

(54) LIGHTING DEVICE HAVING LIGHT MIXING OPTICS AND RING-SHAPED COLLIMATING STRUCTURE

(71) Applicant: SIGNIFY HOLDING B.V., Eindhoven (NL)

(72) Inventors: Johannes Petrus Maria Ansems, Eindhoven (NL); Michel Cornelis Josephus Marie Vissenberg, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/046,162

(22) PCT Filed: Apr. 8, 2019

(86) PCT No.: PCT/EP2019/058750
§ 371 (c)(1),
(2) Date: Oct. 8, 2020

(87) PCT Pub. No.: WO2019/201634
PCT Pub. Date: Oct. 24, 2019

(65) Prior Publication Data
US 2021/0062996 A1 Mar. 4, 2021

(30) Foreign Application Priority Data

Apr. 19, 2018 (EP) .................................... 18168312

(51) Int. Cl.
| | | |
|---|---|---|
| *F21V 5/04* | (2006.01) | |
| *F21V 5/00* | (2018.01) | |
| *F21V 23/00* | (2015.01) | |
| *F21V 5/08* | (2006.01) | |
| *F21Y 105/18* | (2016.01) | |

(Continued)

(52) U.S. Cl.
CPC .............. *F21V 5/045* (2013.01); *F21V 5/004* (2013.01); *F21V 5/007* (2013.01); *F21V 5/08* (2013.01);
(Continued)

(58) Field of Classification Search
CPC .......... F21V 5/045; F21V 5/004; F21V 5/007; F21V 7/0091; F21V 23/003; F21V 5/08;
(Continued)

(56) References Cited

U.S. PATENT DOCUMENTS 9,784,430 B2 * 10/2017 Shen ........................ F21V 5/045
10,481,372 B2 * 11/2019 Schwalenberg ..... G02B 3/0037
(Continued)

FOREIGN PATENT DOCUMENTS

| CN | 102032472 A | 4/2011 |
|---|---|---|
| CN | 202082809 U | 12/2011 |

(Continued)

OTHER PUBLICATIONS

Patent Translate Powered by EPO and Google, "Description CN102829430A", Jun. 15, 2021, pp. 1-15.*

*Primary Examiner* — Alan B Cariaso
(74) *Attorney, Agent, or Firm* — Daniel J. Piotrowski

(57) ABSTRACT

A lighting device (200) comprising: a plurality of solid state lighting elements (112, 114, 116, 118, 122, 124, 126, 128) arranged in a ring-shaped geometry (100); an optical element (210) comprising a ring-shaped collimating structure (232) configured to collimate light emitted by the plurality of solid state lighting elements; and light-mixing optics (220) configured to mix light emitted by the plurality of solid state lighting elements, wherein the light-mixing optics (220) is configured to apply a different degree of light-mixing in a tangential direction of the ring-shaped collimating structure (210) than in a radial direction.

17 Claims, 5 Drawing Sheets

(51) Int. Cl.
 *F21Y 113/10* (2016.01)
 *F21Y 115/10* (2016.01)
(52) U.S. Cl.
 CPC ......... *F21V 23/003* (2013.01); *F21Y 2105/18* (2016.08); *F21Y 2113/10* (2016.08); *F21Y 2115/10* (2016.08)
(58) Field of Classification Search
 CPC ... G02B 3/08; G02B 19/0066; F21Y 2105/18; F21Y 2113/10; F21Y 2115/10
 See application file for complete search history.

(56) References Cited

U.S. PATENT DOCUMENTS

| | | | |
|---|---|---|---|
| 2003/0081419 A1 | 5/2003 | Jacob et al. | |
| 2013/0088142 A1* | 4/2013 | Allen | F21K 9/62 313/498 |
| 2013/0270585 A1* | 10/2013 | Mei | H01L 25/0753 257/89 |
| 2014/0049951 A1 | 2/2014 | Ariyoshi | |
| 2014/0316742 A1* | 10/2014 | Sun | F21V 7/0091 702/167 |
| 2016/0356457 A1 | 12/2016 | Wang | |
| 2017/0205051 A1 | 7/2017 | Jorgensen | |

FOREIGN PATENT DOCUMENTS

| | | |
|---|---|---|
| CN | 202268346 U | 6/2012 |
| CN | 102829430 A | 12/2012 |
| DE | 3248512 A1 | 7/1984 |
| WO | 2008080165 A2 | 7/2008 |

* cited by examiner

LIGHTING DEVICE HAVING LIGHT MIXING OPTICS AND RING-SHAPED COLLIMATING STRUCTURE

CROSS-REFERENCE TO PRIOR APPLICATIONS

This application is the U.S. National Phase application under 35 U.S.C. § 371 of International Application No. PCT/EP2019/058750, filed on Apr. 8, 2019, which claims the benefit of European Patent Application No. 18168312.9, filed on Apr. 19, 2018. These applications are hereby incorporated by reference herein.

TECHNICAL FIELD

The present invention relates to a lighting device comprising a plurality of solid state lighting elements.

BACKGROUND

Light sources with tunable brightness and color are becoming more common. A simple light source with tunable brightness is an incandescent light bulb where the current through the filament can be adjusted. In turn, changing the current through the filament also affects the color of the light source. However, incandescent light bulbs are not energy efficient. Therefore, modern light sources are usually based on light emitting diodes (LEDs). In this way, less energy is needed for illumination.

Usually, a single light source contains many individual LEDs. By combining LEDs of different types, it is possible to produce light sources with specific colors. The color of the light source can also be tuned by individual control of the different types of LEDs. However, the arrangement of the LEDs in the light source will affect the appearance of the light source. A large spacing between the LEDs will result in differences in color and brightness. Usually, the LEDs are positioned very close together in the light source to overcome this issue. However, increasing the number of LEDs or LED types makes this solution more cumbersome and difficult to realize due to size constraints set by standardizations of retrofit lamps.

SUMMARY OF THE INVENTION

It is an object of the present inventive concept to at least reduce the above problems by providing a lighting device.

According to a first aspect, this and other objects are achieved by a lighting device comprising: a plurality of solid state lighting elements arranged in a ring-shaped geometry having a first central axis of symmetry; an optical element comprising a ring-shaped collimating structure configured to collimate light emitted by the plurality of solid state lighting elements, the ring-shaped collimating structure having a second central axis of symmetry, wherein the optical element is arranged in relation to the plurality of solid state lighting elements such that the first and second central axis of symmetry coincides; and light-mixing optics configured to mix light emitted by the plurality of solid state lighting elements, wherein the light-mixing optics is configured to apply a different degree of mixing in a tangential direction of the ring-shaped collimating structure than in a radial direction of the ring-shaped collimating structure.

By means of the present lighting device it is possible to reduce visible differences in a light distribution in space, and/or visible differences in an emitting area of the lighting device.

The present lighting device comprises a plurality of solid state lighting elements arranged in a ring-shaped geometry having a first central axis of symmetry. For instance, the plurality of solid state lighting elements may be light emitting diodes (LEDs). The plurality of solid state lighting elements comprises at least two groups of solid state lighting elements.

The present lighting device comprises an optical element. The optical element comprises a ring-shaped collimating structure configured to collimate light emitted by the plurality of solid state lighting elements, the ring-shaped collimating structure having a second central axis of symmetry. The ring-shaped collimating structure may be an optical lens having a ring-shaped focus. This said, solid state lighting elements arranged in the ring-shaped geometry will be in focus on the parts closest to each solid state lighting element. However, the optical element does not have a ring-shaped focus in the sense that all the light originating from the ring-shaped focus position will be in focus. The optical element is arranged in relation to the plurality of solid state lighting elements such that the first and second central axis of symmetry coincides. In other words, the optical element and the plurality of solid state lighting elements are aligned in relation to their respective central axes. The optical element may be arranged such that the focal plane of the ring-shaped collimating structure coincides with the plurality of solid state lighting elements. In other words, the optical element may be arranged such that each solid state lighting element of the plurality of solid state lighting elements are positioned in or near the ring-shaped focus of the optical element. Thereby, light emitted from each solid state lighting element of the plurality of solid state lighting elements may be at least partially collimated after the optical element. The optical element may be made of silicone, polycarbonate or PMMA. The optical element may be injection molded.

An advantage of the optical element comprising a ring-shaped collimating structure may be that it collimates the light emitted from the plurality of solid state lighting elements arranged in a ring-shaped geometry. In other words, the light emitted by the lighting device may be in the form of a beam of light.

The present lighting device comprises light-mixing optics. The light-mixing optics are configured to mix light emitted by the plurality of solid state lighting elements, wherein the light-mixing optics are configured to apply a different degree of mixing in a tangential direction of the ring-shaped collimating structure than in a radial direction of the ring-shaped collimating structure.

The light-mixing optics may mix the light emitted from the plurality of solid state lighting elements by blurring structural features present in the plurality of solid state lighting elements. In other words, structural features of the ring-shaped arrangement of the plurality of solid state lighting elements in the light emitted from the plurality of solid state lighting elements may be reduced, thereby mixing the light emitted from the solid state lighting elements. The light-mixing optics may broaden the beam of light emitted from the lighting device. The amount of beam broadening in the tangential direction of the ring-shaped collimating structure caused by the light-mixing optics may be different than in the radial direction of the ring-shaped collimating structure. A combination of the ring-shaped collimating structure and the light-mixing optics may result in a predetermined divergence of the beam of light emitted from the lighting device.

"Mixing" should be construed as an act of combining light emitted from different sources. In the present disclosure, light is emitted from at least two groups of solid state lighting elements. Thereby, light from the at least two groups of solid state lighting elements is combined in a way such that light emitted from the lighting device may have less variations in space. Light is usually mixed by light scattering. For instance, light may be scattered by particles, irregular surface structures, or more controlled beam spreading by microlenses. Light scattering increases beam spreading, and beam spreading may be reduced by a collimating structure.

An advantage by mixing the light emitted from the plurality of solid state lighting elements may be an increase in uniformity in space of the light emitted from the plurality of solid state lighting elements.

An advantage of applying a different degree of mixing in the tangential direction of the ring-shaped collimating structure than in the radial direction of the ring-shaped collimating structure may be that variations may be different in the tangential direction of the ring-shaped collimating structure and in the radial direction of the ring-shaped collimating structure. In other words, the structural features of the plurality of solid state lighting elements arranged in a ring-shaped geometry are different in a tangential direction compared to a radial direction of the ring-shaped geometry, and may result in different variations in the tangential direction of the ring-shaped collimating structure compared to the radial direction of the ring-shaped collimating structure.

The plurality of solid state lighting elements may comprise at least two groups of solid state lighting elements. An advantage of having at least two groups of solid state lighting elements may be that it enables independent control of an intensity of the first group and an intensity of the second group. In other words, it may be possible to control light emitted from the lighting device by independently controlling the intensity of the first group and the intensity of the second group. A further advantage of having at least two groups of solid state lighting elements may be that it is possible to combine the solid state elements from the at least two groups of solid state elements to produce the light emitted from the lighting device.

The solid state lighting elements of a group may be configured to emit light with a different color spectrum than the solid state lighting elements of a second group. For instance, the solid state lighting elements of the first group may have a color-spectrum with a warmer or a colder color temperature than the solid state lighting elements of the second group. In case the plurality of solid state lighting elements comprises more than two groups, the solid state lighting elements may have color-spectra with different color temperatures for each group. Alternatively, the solid state lighting elements of the first group may have a color-spectrum comprising colors that are absent in the color-spectrum of the solid state lighting elements of the second group. In other words, the solid state lighting elements of the first group may emit light of a different color than the solid state lighting elements of the second group. In case the plurality of solid state lighting elements comprises more than two groups, the solid state lighting elements may have color-spectra comprising colors that are absent in the color-spectra of the other groups. In other words, the solid state lighting elements of different groups may emit light of different colors. It is to be understood that different combinations of the above examples may be realized.

An advantage of having at least two groups of solid state lighting elements with different color spectra may be that it enables independent control of an intensity of the color spectrum of the first group and an intensity of the color spectrum of the second group. In other words, it may be possible to control a color spectrum of light emitted from the lighting device by independently controlling the intensity of the color spectrum of the first group and the intensity of the color spectrum of the second group.

An advantage of having at least two groups of solid state lighting elements with different color spectra may be that it is possible to combine the solid state elements from the at least two groups of solid state elements to produce the lighting device having a predetermined color spectrum of the light emitted from the lighting device.

The optical element may be arranged such that a focus of a segment of the optical element is on a nearest portion of the plurality of solid-state lighting elements arranged in a ring-shaped geometry. In other words, the focus of a segment of the optical element may be on a, in the radial direction, nearest portion of the plurality of solid-state lighting elements arranged in a ring-shaped geometry.

An advantage of arranging the optical element such that the focus of the optical element is on a nearest side of the plurality of solid-state lighting elements arranged in a ring-shaped geometry may be that light emitted by the plurality of solid-state lighting elements is at least partially collimated by the optical element.

The degree of light-mixing may be larger in the tangential direction than in the radial direction. A higher degree of light-mixing in the tangential direction may be more efficient in case variations in space is mainly due to variations in the source. Since the source comprises the plurality of solid state lighting elements arranged in a ringed-shaped geometry, variations in the source may mainly be in the tangential direction of the collimating structure.

An advantage of applying a higher degree of light-mixing in the tangential direction of the ring-shaped collimating structure than in the radial direction of the ring-shaped collimating structure may be that variations are larger in the tangential direction of the ring-shaped collimating structure than in the radial direction of the ring-shaped collimating structure.

The solid state lighting elements may be arranged in an alternating manner with respect to the at least two groups of solid state lighting elements.

An advantage of arranging in an alternating manner is that the degree of light-mixing may be reduced. The degree of light-mixing may be reduced since solid state lighting elements with different color spectra are placed close together. In other words, light emitted from the solid state lighting elements may require less light-mixing when placed in an alternating manner. The solid state lighting elements may be arranged in an alternating manner in the tangential direction of the ring-shaped geometry and/or in the radial direction of the ring-shaped geometry.

It is to be understood that it is possible to arrange more than two groups of solid state lighting elements in an alternating manner. For example, in case three groups of solid state lighting elements are arranged in an alternating manner, a solid state lighting element from a first group may be followed by a solid state lighting element from a second group. The solid state lighting element from a second group may then be followed by a solid state lighting element from a third group. The solid state lighting element from a third group may then be followed by a solid state lighting element from the first group. The pattern of arranging the solid state elements from the three groups may then be repeated. It is to be understood that it may be possible to arrange more than three groups in an alternating manner in the way described above.

The optical element may be a total internal reflection Fresnel lens. The Fresnel lens may be made of silicone, polycarbonate or PMMA. The Fresnel lens is preferentially made of silicone. The Fresnel lens may be produced by injection molding.

An advantage of using a total internal reflection Fresnel lens may be that the optical element is thinner than a conventional optical lens with similar collimating properties.

An advantage of using a total internal reflection Fresnel lens may be that it is possible to change a focal point of the Fresnel lens to a ring-shaped focus by radially shifting a surface structure of the Fresnel lens.

The ring-shaped collimating structure may comprise one or more ring-shaped prism structures.

An advantage of an optical element comprising one or more ring-shaped prism structures may be that it is possible to change a focal point of the optical element to a ring-shaped focus by radially shifting the one or more ring-shaped prism structures.

The one or more ring-shaped prism structures may be totally internal reflection prism structures.

The ring-shaped collimating structure may be arranged at a light entry surface of the optical element.

The light-mixing optics may be arranged at a light exit surface of the optical element. For example, the light-mixing optics may be a surface texture arranged at the light exit surface of the optical element.

An advantage of arranging the light-mixing optics at the light exit surface of the optical element may be a more robust positioning of the light-mixing optics relative to the optical element. An advantage of arranging the light-mixing optics at the light exit surface of the optical element may be a more robust lighting device. An advantage of arranging the light-mixing optics at the light exit surface of the optical element may be a more compact lighting device.

The light-mixing optics may be arranged in the optical element. For example, the light-mixing optics may be volume scattering particles arranged in the optical element.

An advantage of arranging the light-mixing optics in the optical element may be a more robust positioning of the light-mixing optics relative to the optical element. An advantage of arranging the light-mixing optics in the optical element may be a more robust lighting device. An advantage of arranging the light-mixing optics in the optical element may be a more compact lighting device.

It is to be understood that the light-mixing optics may be a combination of an arrangement at the light exit surface of the optical element and in the optical element. For example, the light-mixing optics may be a combination of a surface texture on the light exit surface of the optical element and volume scattering particles in the optical element.

The light-mixing optics may comprise a microlens array comprising a plurality of lenslets, wherein the lenslets are elliptical and each has a smaller radius of curvature along the tangential direction of the ring-shaped collimating structure than in the radial direction of the ring-shaped collimating structure. In other words, the elliptical lenslets are arranged such that the major axis of each elliptical lenslet is substantially oriented along the radial direction of the ring-shaped collimating structure.

An advantage of using elliptical lenslets with smaller radius of curvature along the tangential direction of the ring-shaped collimating structure than in the radial direction of the ring-shaped collimating structure may be a higher degree of mixing in the tangential direction of the ring-shaped collimating structure than in the radial direction of the ring-shaped collimating structure.

"Lenslets" should be construed as small lenses or microlenses. The diameter of the lenslets is on the order of 1 mm. The diameter of the lenslets may be 5 mm or less. The diameter of the lenslets may be 10% of the diameter of the optical element or less.

The light-mixing optics may comprise a microlens array comprising a plurality of lenslets, wherein the lenslets are circular and are arranged with a closer spacing in the radial direction of the ring-shaped collimating structure than in the tangential direction of the ring-shaped collimating structure. Arranging the plurality of circular lenslets in this way may result in similar mixing as when using elliptical lenslets as described previously.

An advantage of using circular lenslets arranged with a closer spacing in the radial direction of the ring-shaped collimating structure than in the tangential direction of the ring-shaped collimating structure may be a higher degree of mixing in the tangential direction of the ring-shaped collimating structure than in the radial direction of the ring-shaped collimating structure.

An advantage of using a microlens array comprising a plurality of circular lenses may be a less expensive microlens array.

It is to be understood that the light-mixing optics may be a combination of a microlens array and a surface texture and/or volume scattering particles.

The light-mixing optics may comprise an asymmetric surface texture arranged at a light exit surface of the optical element, wherein the asymmetric surface texture is configured to scatter light exiting from the optical element more in the tangential direction of the ring-shaped collimating structure than in the radial direction of the ring-shaped collimating structure.

An advantage of such an asymmetric surface texture arranged at the light exit surface of the optical element may be a higher degree of mixing in the tangential direction of the ring-shaped collimating structure than in the radial direction of the ring-shaped collimating structure.

It is to be understood that the light-mixing optics may be a combination of the asymmetric surface texture and a microlens array and/or volume scattering particles.

The light-mixing optics may comprise a holographic scattering texture configured to scatter light exiting from the optical element more in the tangential direction of the ring-shaped collimating structure than in the radial direction of the ring-shaped collimating structure.

An advantage of such a holographic scattering texture may be a higher degree of mixing in the tangential direction of the ring-shaped collimating structure than in the radial direction of the ring-shaped collimating structure.

It is to be understood that the light-mixing optics may be a combination of the holographic scattering texture and a microlens array and/or volume scattering particles.

The lighting device may comprise a drive circuitry configured to separately control a drive current to each of the at least two groups of solid state lighting elements. In other words, the drive circuitry if configured to separately control the intensity of the solid state lighting elements of the at least two groups of solid state lighting elements.

An advantage of separate control of the drive current to each of the least two groups of solid state lighting elements may be control of the light emitted by the lighting device.

According to a second aspect a spotlight configured to emit a beam of light having a beam divergence smaller than 24 degrees FWHM is provided. The spotlight comprising a lighting device according to the present disclosure.

A predetermined beam divergence smaller than 24 degrees FWHM may be realized by a combination of the ring-shaped collimating structure and the light-mixing optics. A higher degree of light-mixing may lead to a larger beam divergence. A larger beam divergence may be reduced by the ring-shaped collimating structure.

An advantage of a spotlight comprising a lighting device according to the present disclosure may be that the spotlight is a directional light source having a high degree of uniformity in space. An advantage of a spotlight comprising a lighting device according to the present disclosure may be that the spotlight is a directional light source with reduced visible differences in an emitting area of the spotlight. An advantage of a spotlight comprising a lighting device according to the present disclosure may be that the spotlight is a directional light source with reduced colored shadows of objects illuminated by the spotlight. An advantage of a spotlight comprising a lighting device according to the present disclosure may be the compact sizes of the optical element and the light-mixing optics. In other words, the lighting device in the present disclosure may be combined in a spotlight to be retrofitted.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described as such device may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing", and similar wordings does not exclude other elements.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1A:
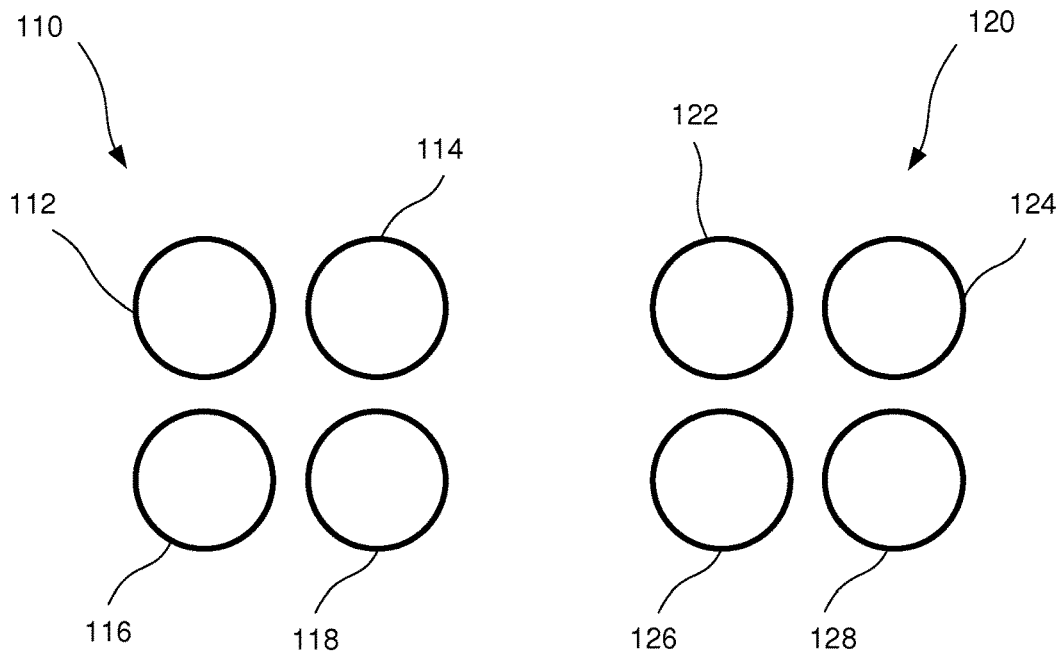
FIG. 1A illustrates a first group of solid state elements and a second group of solid state lighting elements.

FIG. 1A illustrates a first group of solid state lighting elements 110 comprising four solid state lighting elements 112, 114, 116, 118 and a second group of solid state lighting elements 120 comprising four solid state lighting elements 122, 124, 126, 128. The solid state lighting elements 112, 114, 116, 118, 122, 124, 126, 128 are preferentially LEDs. Light emitted from the first group of solid state lighting elements 110 has a first color spectrum. Light emitted from the second group of solid state lighting elements 120 has a second color spectrum. The first color spectrum is warmer than the second color spectrum. In other words, the first color spectrum has a lower color temperature than the second color spectrum. As is known in the art, a color spectrum with lower color temperature comprises more red color than a color spectrum with higher color temperature. It is to be understood that the solid state lighting elements 112, 114, 116, 118 of the first group 110 may be configured to emit light of a similar color spectrum as the solid state lighting elements 122, 124, 126, 128 of the second group 120. Alternatively, the two groups 110, 120 may comprise solid state lighting elements configured to emit light of a single color spectrum.

Figure 1B:
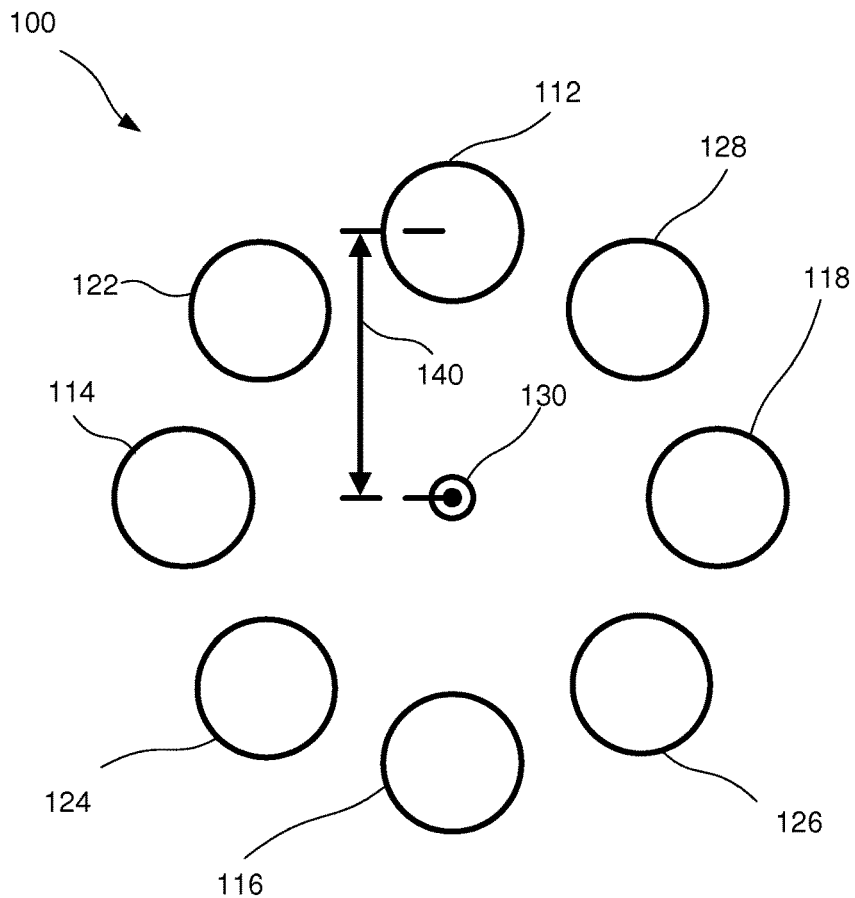
FIG. 1B illustrates eight solid state lighting elements arranged in a ring-shaped geometry.

FIG. 1B illustrates the solid state lighting elements 112, 114, 116, 118, 122, 124, 126, 128 from the first and second groups of solid state lighting elements 110, 120 arranged in a ring-shaped geometry 100. The ring-shaped geometry 100 has a central axis of symmetry 130, which points outwards in FIG. 1. The solid state lighting elements 112, 114, 116, 118, 122, 124, 126, 128 are arranged at a radial distance 140 from the central axis of symmetry 130. The solid state lighting elements 112, 114, 116, 118, 122, 124, 126, 128 are arranged in an alternating manner with respect to their color spectra. In other words, the solid state lighting elements 112, 114, 116, 118, 122, 124, 126, 128 are arranged in an alternating manner with respect to the groups of solid state lighting elements 110, 120. For example, the solid state lighting element 112 from the first group of solid state lighting elements 110 is arranged between two solid state lighting elements 122, 128 from the second group of solid state lighting elements 120. Similarly, the solid state lighting element 122 from the second group of solid state lighting elements 120 is arranged between two solid state lighting elements 112, 114 from the first group of solid state lighting elements 110. As is shown in FIG. 1, the solid state lighting elements 112, 114, 116, 118, 122, 124, 126, 128 are arranged in an alternating manner in an azimuthal direction of the ring-shaped geometry 100.

Figure 2:
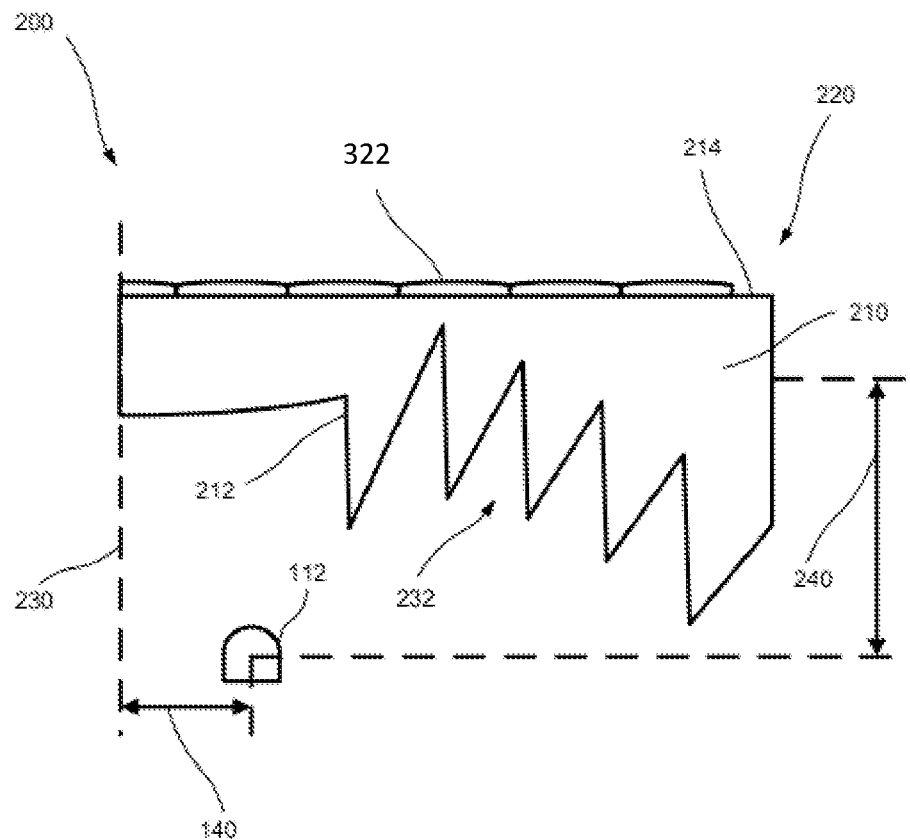
FIG. 2 illustrates a cross section of a lighting device comprising a plurality of solid state lighting elements, an optical element, and light-mixing optics.

FIG. 2 illustrates a cross section of a lighting device 200 comprising a plurality of solid state lighting elements 112, 114, 116, 118, 122, 124, 126, 128, an optical element 210, and light-mixing optics 220. The optical element 210 is preferentially a Fresnel lens. The solid state lighting elements 112, 114, 116, 118, 122, 124, 126, 128 are each arranged at a radial distance 140 from a central axis of symmetry 230 of a ring-shaped collimating structure 232 of the optical element 210. The optical element 210 comprises a light entry surface 212 and a light exit surface 214. The ring-shaped collimating structure of the optical element 210 will be described in more detail in relation to FIGS. 3A and 3B. For clarity, only one solid state lighting element 112 of the plurality of solid state lighting elements 112, 114, 116, 118, 122, 124, 126, 128 is shown in FIG. 2.

The central axis of symmetry 130 of the ring-shaped geometry 100 in FIG. 1 coincides with the central axis of symmetry 230 of the ring-shaped collimating structure of the optical element 210. In other words, the central axis of symmetry 130 of the ring-shaped geometry 100 points outwards in FIG. 1 and it points upwards in FIG. 2. The cross section of the lighting device 200 shown in FIG. 2 is periodic in an azimuthal direction around the central axis of symmetry 230.

The focal point of the optical element 210 is located near the radial distance 140 at which the solid state lighting elements 112, 114, 116, 118, 122, 124, 126, 128 are arranged. The optical element 210 is arranged such that the focus of the optical element 210 is on a nearest side of the ring-shaped geometry 100. In FIG. 2, the solid state lighting element 112 is on the nearest side of the ring-shaped geometry 100. In other words, the focal point of the optical element 210 is ring-shaped. The solid state lighting elements 112, 114, 116, 118, 122, 124, 126, 128 are arranged at a longitudinal distance 240 from the optical element 210. The longitudinal distance 240 may affect the degree of collimation introduced by the optical element 210.

Figure 5A:
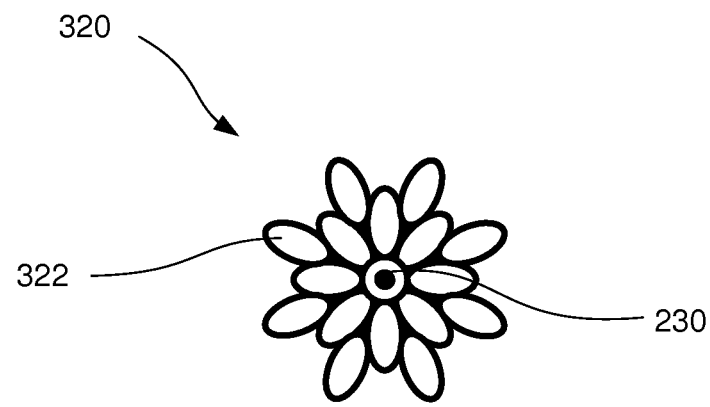
FIG. 5A illustrates a portion of a microlens array comprising elliptical lenslets.

The light-mixing optics 220 shown in FIG. 2 comprises a microlens array of lenslets. The light-mixing optics 220 is configured to apply a different degree of light-mixing in the tangential direction of the ring-shaped collimating structure 232 of the optical element 210 than in the radial direction of the ring-shaped collimating structure 232 of the optical element 210. This may be achieved by using different arrangements of the lenslets in the microlens array. The microlens array may comprise elliptical lenslets 322. Each elliptical lenslet 322 has a smaller radius of curvature along the tangential direction of the ring-shaped collimating structure 232 than in the radial direction of the ring-shaped collimating structure 232. In other words, each elliptical lenslet 322 is arranged such that the major axis of the elliptical lenslet 322 is oriented along the radial direction of the ring-shaped collimating structure 232. This is illustrated in FIG. 5A.

Figure 5B:
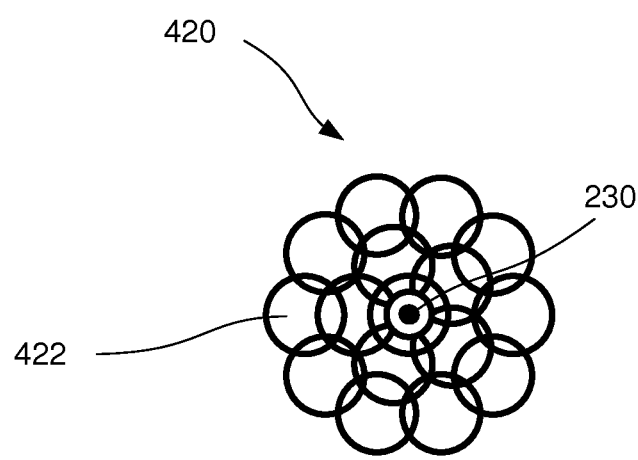
FIG. 5B illustrates a portion of a microlens array comprising intersecting circular lenslets.

The microlens array may comprise circular lenslets 422. The circular lenslets 422 are arranged with a closer spacing in the radial direction of the ring-shaped collimating structure 232 than in the tangential direction of the ring-shaped collimating structure 232. This is illustrated in FIG. 5B.

The microlens array may be arranged on the light exit surface 214 of the optical element 210.

Instead of the microlens array shown in FIG. 2, the light-mixing may be achieved by an asymmetric surface texture arranged at a light exit surface 214 of the optical element 210, a holographic scattering texture, or volume scattering particles in the optical element 210. Different combinations of the above mentioned light-mixing optics may also be used in order to mix the light emitted by the solid state lighting elements 112, 114, 116, 118, 122, 124, 126, 128.

In the lighting device 200, light emitted from the solid state lighting elements 112, 114, 116, 118, 122, 124, 126, 128 enters the optical element 210 through the light entry surface 212 of the optical element 210. The optical element 210 has a ring-shaped collimating structure, which collimates the light emitted by the solid state lighting elements 112, 114, 116, 118, 122, 124, 126, 128. The light exits the optical element 210 through the light exit surface 214 of the optical element 210. The light is mixed by light-mixing optics 220, in this case a microlens array comprising lenslets. The light-mixing optics 220 may act to scatter the light. The light exits the lighting device 200 in the form of a beam of light 510.

Figure 3A:
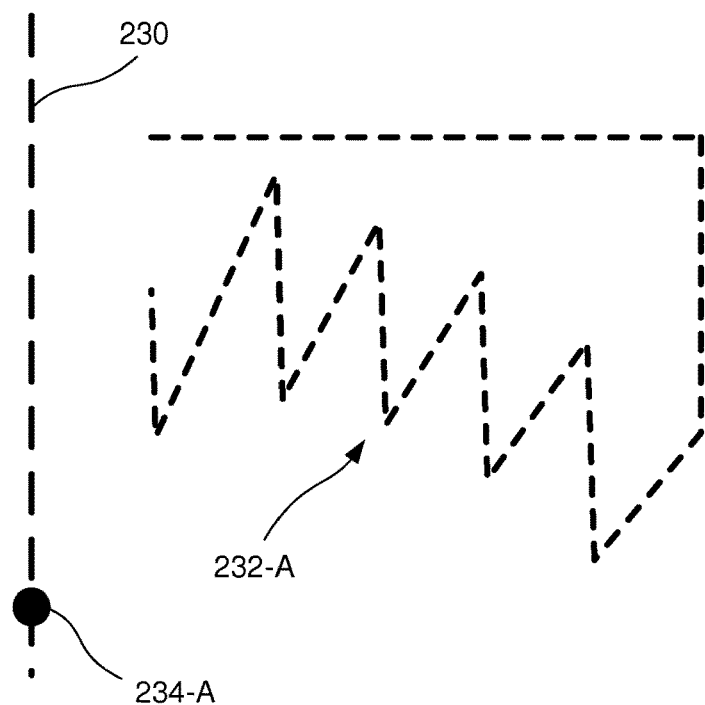
FIG. 3A illustrates a cross section of a collimating structure with its focal point coinciding with the axis of symmetry.
Figure 3B:
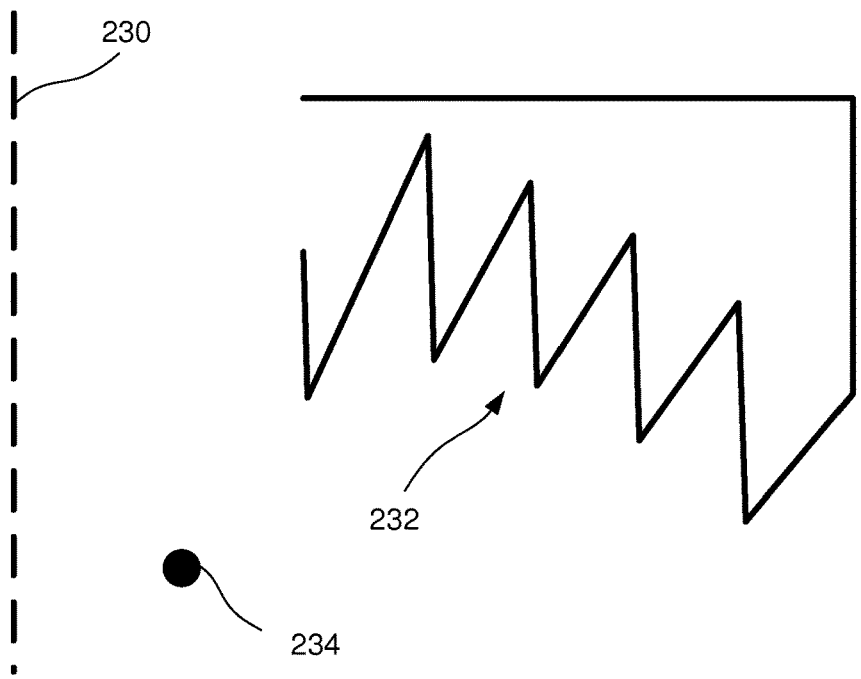
FIG. 3B illustrates a cross section of a collimating structure with its focal point radially shifted from the axis of symmetry.

FIG. 3A illustrates a cross section of a ring-shaped collimating structure 232-A with its focal point 234-A coinciding with the axis of symmetry 230. The collimating structure 234-A may for instance be total internal reflection prisms of a Fresnel lens. The focal point 234-A may be radially shifted by radially shifting the collimating structure 232-A. Such shift is shown in FIG. 3B, where the collimating structure 232 is shifted in relation to the collimating structure 232-A in FIG. 3A. The focal point 234 of the collimating structure 232 is also shifted relative to the focal point 234-A shown in FIG. 3A. The focal point 234 in FIG. 3B is radially shifted from the central axis of symmetry 230 and is thereby a ring-shaped focus. The optical element 210 may be arranged such that the ring-shaped focus resulting from the radially shifted collimating structure 232 coincides with the solid state lighting elements 112, 114, 116, 118, 122, 124, 126, 128 arranged in a ring-shaped geometry 100 as shown in FIG. 1B and FIG. 2. In other words, the optical element 210 may be arranged such that the focal point 234 of a portion of the optical is on a nearest portion of the solid state lighting elements 112, 114, 116, 118, 122, 124, 126, 128 arranged in the ring-shaped geometry 100.

Figure 4:
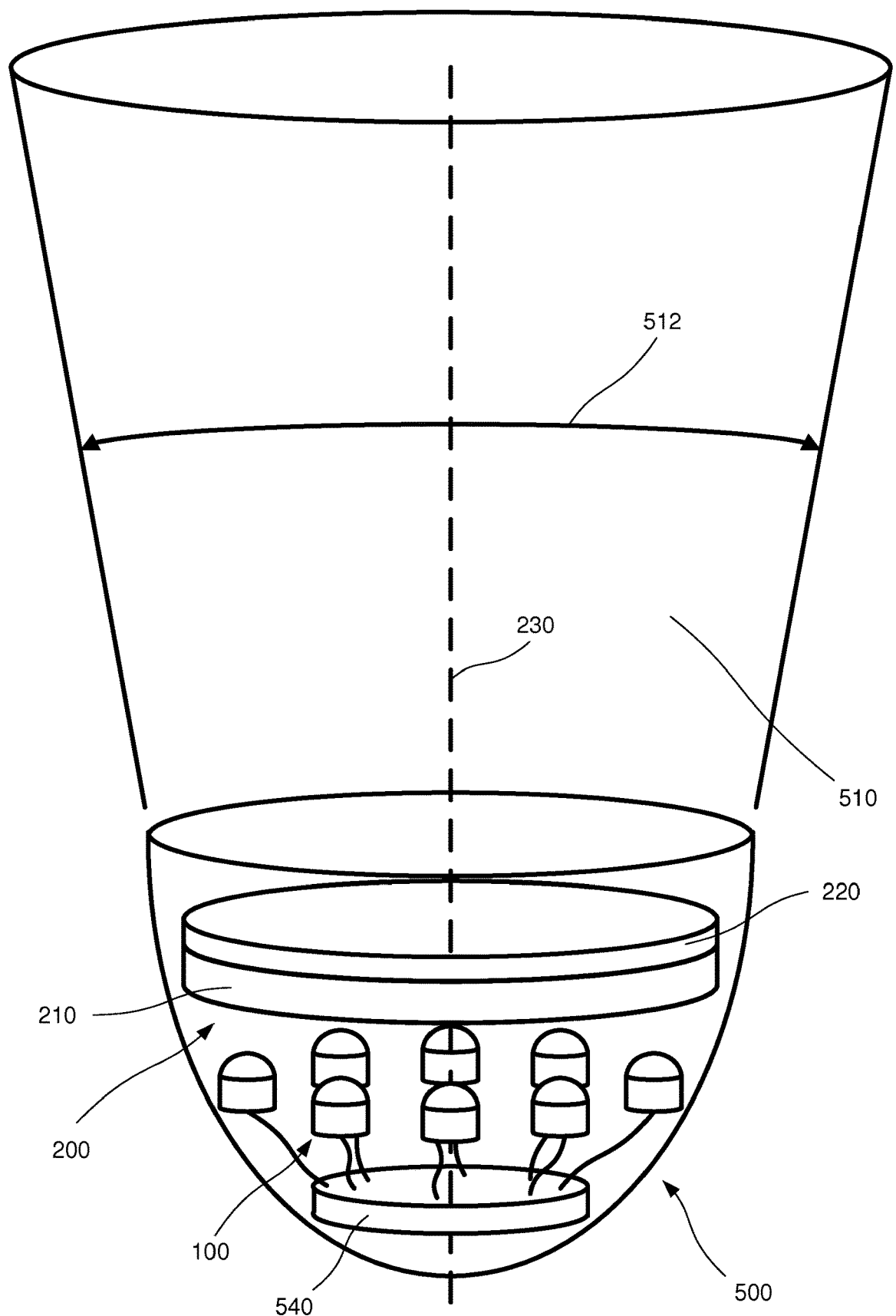
FIG. 4 illustrates a spotlight comprising the present lighting device.

FIG. 4 illustrates a spotlight 500 comprising the present lighting device 200. The lighting device 200 comprises the solid state lighting elements 112, 114, 116, 118, 122, 124, 126, 128 arranged in the ring-shaped geometry 100, the optical element 210 comprising the ring-shaped collimating structure 232, and light-mixing optics 220. For clarity, the structure of the ring-shaped collimating structure 232 and the structure of the light-mixing optics 220 are not shown in FIG. 4. In other words, it should not be interpreted as that the ring-shaped collimating structure 232 and the structure of the light-mixing optics 220 are not present, but merely left out in order to improve readability of FIG. 4.

As is shown in FIG. 4, the lighting device 100 further comprises a drive circuitry 540 connected to the solid state lighting elements 112, 114, 116, 118, 122, 124, 126, 128. The drive circuitry 540 is configured to control a drive current to each of the two groups 110, 120 of solid state lighting elements.

The lighting device 100 is further configured such that the beam of light 510 emitted by the lighting device 100 has a divergence 512 of 24 degrees FWHM. It is to be understood that the lighting device 100 may be configured such that the beam of light 510 emitted by the lighting device 100 has a predetermined divergence 512 other than 24 degrees FWHM. The spotlight 500 may be a retrofit lamp. The person skilled in the art realizes that the present invention by no means is limited to the preferred embodiments described above. On the contrary, many modifications and variations are possible within the scope of the amended claims.

FIG. 5A illustrates a portion of a microlens array 320 comprising elliptical lenslets 322. The microlens array 320 in the shown example in FIG. 5A is arranged such that the central axis of symmetry 230 of the ring-shaped collimating structure 232 coincides with a central axis of symmetry of the microlens array 320. Each elliptical lenslet 322 is arranged such that the major axis of the elliptical lenslet 322 is oriented along the radial direction of the ring-shaped collimating structure 232.

It is to be understood that the shown arrangement of the elliptical lenslets 322 in FIG. 5A is an example only, and other arrangements of the elliptical lenslet 322 may be possible. For example, the microlens array 320 may comprise a larger number of elliptical lenslets 322 than shown in FIG. 5A. The microlens array 320 may comprise additional elliptical lenslets 322 arranged at a larger radial distance from the central axis of symmetry 230. The elliptical lenslets 322 comprised in the microlens array 320 are preferably arranged in a closed tiling.

FIG. 5B illustrates a portion of a microlens array 420 comprising intersecting circular lenslets 422. Full circles are shown in FIG. 5B in order to illustrate the configuration of the microlens array 420. It is to be understood that intersecting circular lenslets 422 are merged in the microlens array 420, The microlens array 420 in the shown example in FIG. 5B is arranged such that the central axis of symmetry 230 of the ring-shaped collimating structure 232 coincides with a central axis of symmetry of the microlens array 420. The circular lenslets 422 are arranged with a closer spacing in the radial direction of the ring-shaped collimating structure 232 than in the tangential direction of the ring-shaped collimating structure 232. Each intersecting circular lenslet 422 has a polygonal boundary, created by the intersect of neighboring circular lenslets 422.

It is to be understood that the shown arrangement of the circular lenslets 422 in FIG. 5B is an example only, and other arrangements of the circular lenslet 422 may be possible. For example, the microlens array 420 may comprise a larger number of circular lenslets 422 than shown in FIG. 5B. The additional circular lenslets 422 may be arranged at a larger radial distance from the central axis of symmetry 230.

It is to be understood that the microlens arrays 320, 420 may not have central axes of symmetry. In other words, asymmetric arrangements of the lenslets 322, 422 may be used in the microlens arrays.

It is to be understood that the light-mixing optics may comprise any combination of a microlens array, an asymmetric surface texture and volume scattering particles.

It is to be understood that the arrangements in FIG. 5A and FIG. 5B may be combined, such that the elliptical lenslets 322 are arranged with a closer spacing in the radial direction of the ring-shaped collimating structure 232 than in the tangential direction of the ring-shaped collimating structure 232. The elliptical lenslets 322 arranged in this way may intersect. For such arrangement, each intersecting elliptical lenslet may have a polygonal boundary, created by the intersect of neighboring elliptical lenslets.

Additionally, variations to the disclosed embodiments can be understood and effected by the skilled person in practicing the claimed invention, from a study of the drawings, the disclosure, and the appended claims.

The invention claimed is:

1. A lighting device comprising:
a plurality of solid state lighting elements arranged in a ring-shaped geometry having a first central axis of symmetry;
an optical element comprising a ring-shaped collimating structure configured to collimate light emitted by the plurality of solid state lighting elements, the ring-shaped collimating structure having a second central axis of symmetry, wherein the optical element is arranged in relation to the plurality of solid state lighting elements such that the first and second central axis of symmetry coincides; and
light-mixing optics configured to mix light emitted by the plurality of solid state lighting elements, wherein the light-mixing optics comprises a microlens array comprising a plurality of lenslets arranged at least on an exit surface opposite to the ring-shaped collimating structure, said light-mixing optics is configured to apply a different degree of light-mixing in a tangential direction of the ring-shaped collimating structure than in a radial direction of the ring-shaped collimating structure, and
wherein the optical element is arranged such that a focus of a segment of the optical element is on a nearest portion of the plurality of solid-state lighting elements arranged in a ring-shaped geometry;
wherein the lenslets are elliptical and each has a smaller radius of curvature along the tangential direction of the ring-shaped collimating structure than in the radial direction of the ring-shaped collimating structure.

2. The lighting device according to claim 1, wherein the plurality of solid state lighting elements comprises at least two groups of solid state lighting elements, wherein the solid state lighting elements of a first group are configured to emit light with a different color spectrum than the solid state lighting elements of a second group.

3. The lighting device according to claim 1, wherein the degree of light-mixing is larger in the tangential direction than in the radial direction.

4. The lighting device according to claim 2, wherein the solid state lighting elements are arranged in an alternating manner with respect to the at least two groups of solid state lighting elements.

5. The lighting device according to claim 1, wherein the optical element is a total internal reflection Fresnel lens.

6. The lighting device according to claim 1, wherein the ring-shaped collimating structure is arranged at a light entry surface of the optical element.

7. The lighting device according to claim 1, wherein the light-mixing optics are arranged at exit surface of the optical element.

8. The lighting device according to claim 1, wherein the light-mixing optics are arranged in the optical element.

9. The lighting device according to claim 1, wherein the lenslets are elliptical and each has a smaller radius of curvature along the tangential direction of the ring-shaped collimating structure than in the radial direction of the ring-shaped collimating structure.

10. A lighting device comprising:
a plurality of solid state lighting elements arranged in a ring-shaped geometry having a first central axis of symmetry;
an optical element comprising a ring-shaped collimating structure configured to collimate light emitted by the plurality of solid state lighting elements, the ring-shaped collimating structure having a second central axis of symmetry, wherein the optical element is arranged in relation to the plurality of solid state lighting elements such that the first and second central axis of symmetry coincides; and light-mixing optics configured to mix light emitted by the plurality of solid state lighting elements, wherein the light-mixing optics comprises a microlens array comprising a plurality of lenslets arranged at least on an exit surface opposite to the ring-shaped collimating structure, said light-mixing optics is configured to apply a different degree of light-mixing in a tangential direction of the ring-shaped collimating structure than in a radial direction of the ring-shaped collimating structure, and wherein the optical element is arranged such that a focus of a segment of the optical element is on a nearest portion of the plurality of solid-state lighting elements arranged in a ring-shaped geometry, wherein the lenslets are circular and are arranged with a closer spacing in the radial direction of the ring-shaped collimating structure than in the tangential direction of the ring-shaped collimating structure.

11. The lighting device according to claim 1, wherein the light-mixing optics comprises an asymmetric surface texture arranged at a light exit surface of the optical element, wherein the asymmetric surface texture is configured to scatter light exiting from the optical element more in the tangential direction of the ring-shaped collimating structure than in the radial direction of the ring-shaped collimating structure.

12. The lighting device according to claim 1, wherein the light-mixing optics comprises a holographic scattering texture configured to scatter light exiting from the optical element more in the tangential direction of the ring-shaped collimating structure than in the radial direction of the ring-shaped collimating structure.

13. The lighting device according to claim 2, further comprising a drive circuitry configured to separately control a drive current to each of the at least two groups of solid state lighting elements.

14. A spotlight configured to emit a beam of light having a beam divergence smaller than 24 degrees FWHM, the spotlight comprising a lighting device according to claim 1.

15. The lighting device according to claim 1, wherein the lenslets are arranged asymmetrically.

16. The lighting device according to claim 1, wherein a portion of the lenslets are circular and a portion of the lensets are elliptical and the elliptical lenslets are arranged with a closer spacing in the radial direction of the ring-shaped collimating structure than in the tangential direction of the ring-shaped collimating structure.

17. The lighting device according to claim 16, wherein the elliptical lenslets intersect.

* * * * *